US011943099B2

(12) United States Patent
Zhuang et al.

(10) Patent No.: US 11,943,099 B2
(45) Date of Patent: Mar. 26, 2024

(54) CAPABILITY NOTIFICATION METHOD AND RELATED DEVICE

(71) Applicant: Huawei Technologies Co., Ltd., Shenzhen (CN)

(72) Inventors: Shunwan Zhuang, Beijing (CN); Haibo Wang, Beijing (CN); Tianran Zhou, Beijing (CN); Weidong Li, Beijing (CN); Jie Dong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/153,883

(22) Filed: Jan. 12, 2023

(65) Prior Publication Data

US 2023/0145245 A1 May 11, 2023

Related U.S. Application Data

(63) Continuation of application No. PCT/CN2021/105883, filed on Jul. 13, 2021.

(30) Foreign Application Priority Data

Jul. 13, 2020 (CN) .......................... 202010672048.2

(51) Int. Cl.
 *H04L 41/0803* (2022.01)
(52) U.S. Cl.
 CPC ................................ *H04L 41/0803* (2013.01)
(58) Field of Classification Search
 CPC .................................................. H04L 41/0803
 (Continued)

(56) References Cited

U.S. PATENT DOCUMENTS 10,097,372 B2 * 10/2018 Bhattacharya ........ H04L 41/342
10,425,491 B2 * 9/2019 Bugenhagen ......... H04L 41/083
(Continued)

FOREIGN PATENT DOCUMENTS

CN 107222321 A 9/2017
CN 107786451 A 3/2018
(Continued)

OTHER PUBLICATIONS

Lu, B., Xu, L., Song, Y., Dai, L., Liu, M., Zhou, T., . . . & Song, H. (Aug. 2019). iFIT: Intelligent flow information telemetry. In Proceedings of the ACM SIGCOMM 2019 Conference Posters and Demos (pp. 15-17). (Year: 2019).*

(Continued)

*Primary Examiner* — Melvin H Pollack
(74) *Attorney, Agent, or Firm* — Slater Matsil, LLP

(57) ABSTRACT

A method according to embodiments of this application includes: A first network device sends a first packet to a second network device, where the first packet includes first indication information, and the first indication information indicates a support status of an iFIT capability corresponding to the first network device or a first service module included in the first network device. The first network device sends the packet to the second network device, to notify the support status of the IFIT capability of the first network device. In this way, the second network device can determine, based on the iFIT capability of the first network device, whether to encapsulate a measurement header, to avoid that a service packet cannot be correctly processed because the first network device cannot strip the measurement header from the service packet.

20 Claims, 8 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 10,432,425 | B2* | 10/2019 | Wang | H04L 12/4625 |
| 10,673,978 | B2* | 6/2020 | Cook | H04L 12/66 |
| 11,032,193 | B2* | 6/2021 | Gandhi | H04L 45/507 |
| 11,228,515 | B2 | 1/2022 | Zhou et al. | |
| 11,316,869 | B2* | 4/2022 | Hill | H04L 9/12 |
| 11,343,261 | B2* | 5/2022 | Bhandari | H04L 69/22 |
| 11,528,190 | B2* | 12/2022 | Mallipudi | H04L 67/14 |
| 11,539,592 | B2* | 12/2022 | Kotalwar | H04L 41/0893 |
| 11,570,245 | B2* | 1/2023 | Chan | H04L 67/12 |
| 11,588,701 | B2* | 2/2023 | Zheng | H04L 41/122 |
| 11,621,913 | B2* | 4/2023 | Dutta | H04L 45/34 370/392 |
| 11,636,229 | B2* | 4/2023 | Bisht | H04L 63/1416 37/329 |
| 11,652,749 | B2* | 5/2023 | Degrace | H04L 67/1095 709/238 |
| 11,677,672 | B2* | 6/2023 | Muntz | H04L 12/44 370/236 |
| 11,711,374 | B2* | 7/2023 | Ross | G06F 21/604 726/28 |
| 11,750,640 | B2* | 9/2023 | Oberg | H04L 63/10 726/4 |
| 11,762,725 | B2* | 9/2023 | Fusco | G06F 9/542 714/48 |
| 11,777,811 | B2* | 10/2023 | Tomkins | H04L 43/04 709/224 |
| 2010/0081411 | A1* | 4/2010 | Montenero | G01N 33/0075 455/404.2 |
| 2021/0112002 | A1* | 4/2021 | Pan | H04L 47/129 |
| 2021/0203586 | A1 | 7/2021 | Liu et al. | |
| 2021/0377125 | A1* | 12/2021 | Zheng | H04L 45/26 |
| 2022/0058042 | A1* | 2/2022 | Vanjare | G06F 9/45558 |
| 2022/0217070 | A1 | 7/2022 | Zhou et al. | |
| 2023/0023597 | A1* | 1/2023 | Shrestha | G06F 8/65 |

FOREIGN PATENT DOCUMENTS

| | | |
|---|---|---|
| CN | 108737128 A | 11/2018 |
| CN | 110912796 A | 3/2020 |
| CN | 110971445 A | 4/2022 |
| EP | 3611877 A1 | 2/2020 |
| WO | 2009046652 A1 | 4/2009 |
| WO | 2019233179 A1 | 12/2019 |

OTHER PUBLICATIONS

R. Ballamajalu, S. V. R. Anand and M. Hegde, "Co-iOAM: In-situ telemetry metadata transport for resource constrained networks within IETF standards framework," 2018 10th International Conference on Communication Systems & Networks (COMSNETS), Bengaluru, India, 2018, pp. 573-576. (Year: 2018).*

Tan, L., Su, W., Zhang, W., Lv, J., Zhang, Z., Miao, J., . . . & Li, N. (2021). In-band network telemetry: A survey. Computer Networks, 186, 107763. (Year: 2021).*

D. M. Lee and K. Lee, "A Development of the Nano OS Kernel based on System State-Monitor for Ubiquitous Sensor Network," 2008 10th International Conference on Advanced Communication Technology, Gangwon, Korea (South), 2008, pp. 963-966. (Year: 2008).*

Fioccola, G. et al., "BGP Extension for Advertising In-situ Flow Information Telemetry (IFIT) Capabilities draft-ietf-dr-bgp-ifit-capabilities-00," Network Working Group, Internet-Draft, Intended Status: Standards Track, Expires: Jan. 9, 2023, Huawei, Jul. 8, 2022, 10 pages.

Wang, Y. et al., "BGP Extension for Advertising In-situ Flow Information Telemetry (IFIT) Capabilities draft-wang-idr-bgp-ifit-capabilities-03," Network Working Group, Internet-Draft, Intended Status: Standards Track, Expires: Jan. 12, 2022, China Unicom, Jul. 11, 2021, 10 pages.

Brockners, F. et al., "In-situ OAM Deployment; draft-brockners-opsawg-ioam-deployment-00," opsawg, Internet-Draft, Intended status: Best Current Practice, Expires: May 2, 2020, Oct. 30, 2019, 22 pages.

Song, H. et al., "In-situ Flow Information Telemetry; draft-song-opsawg-ifit framework-12," OPSAWG, Internet-Draft, Intended status: Informational, Expires: Oct. 16, 2020, Apr. 14, 2020, 28 pages.

Wang, Y. et al., "Extensions to BGP-LS for Advertising In-situ Flow Information Telemetry (IFIT) Node Capability; draft-wang-idr-bgp-ls-ifit-node-capability-03," Interdomain Routing Working Group, Internet-Draft, Intended status: Standards Track, Expires: Sep. 14, 2020, Mar. 13, 2020, 7 pages.

* cited by examiner

PE: Provider edge router    ABR: Area border router

CAPABILITY NOTIFICATION METHOD AND RELATED DEVICE

CROSS-REFERENCE TO RELATED APPLICATIONS

This application is a continuation of International Application No. PCT/CN2021/105883, filed on Jul. 13, 2021, which claims priority to Chinese Patent Application No. 202010672048.2, filed on Jul. 13, 2020. The disclosures of the aforementioned applications are hereby incorporated by reference in their entireties.

TECHNICAL FIELD

This application relates to the field of communication technologies, and in particular, to a capability notification method and a related device.

BACKGROUND

In-situ flow information telemetry (iFIT) is an operation, administration, and maintenance (OAM) detection technology, and can directly obtain, based on measurement information carried in a real data packet, performance indicators such as a real packet loss rate and a delay of a network.

Usually, a measurement domain in which iFIT is performed includes a head node and a tail node. The head node may also be referred to as an encapsulation node (Encap node), and the tail node may also be referred to as a decapsulation node (Decap node). Optionally, the measurement domain further includes an intermediate node. After a packet enters the measurement domain, the head node encapsulates a measurement header in the packet, and forwards the packet to the intermediate node. The intermediate node may perform measurement and data collection based on the measurement header in the packet, or the intermediate node transparently transmits the packet to the tail node. Before the packet exits the measurement domain, the tail node reports data collected by the intermediate node, and strips the measurement header from the packet, to restore an original packet. A valid range of measurement header encapsulation is within the measurement domain. If a packet into which a measurement header is encapsulated is diffused out of the measurement domain, the packet cannot be identified or even discarded, thereby affecting normal service packet forwarding.

Currently, before encapsulating the measurement header, the head node needs to confirm that the tail node has an iFIT capability. This usually requires operation and maintenance personnel to manually configure related information of a related device, for example, the tail node, on the head node, to ensure that the head node can determine, based on the iFIT capability of the related device, whether to encapsulate the measurement header. However, manual configuration is inefficient and complex, which easily affects normal service packet forwarding.

SUMMARY

This application provides a capability notification method and a related device, to resolve a technical problem of manually configuring complex iFIT capability configuration.

A first aspect of this application provides a capability notification method. The method includes: A first network device sends a first packet to a second network device, where the first packet includes first indication information, and the first indication information indicates a support status of an iFIT capability corresponding to the first network device or a first service module included in the first network device.

In this application, the first network device sends the packet to the second network device, to notify the support status of the IFIT capability of the first network device. In this way, the second network device can determine, based on the iFIT capability of the first network device, whether to encapsulate a measurement header, to avoid that a service cannot be correctly processed because the first network device cannot strip the measurement header from the service packet.

Optionally, in a possible implementation, the support status of the iFIT capability includes a status that the first network device or the first service module is capable of iFIT processing or not capable of iFIT processing.

In this application, the first network device directly notifies, in the packet, that the first network device is capable of iFIT processing or not capable of iFIT processing, so that the second network device initiates corresponding iFIT measurement based on the iFIT capability type supported by the first network device, or does not initiate corresponding iFIT measurement based on the iFIT capability not supported by the first network device, to improve solution flexibility.

Optionally, in a possible implementation, the iFIT capability includes one or more of a path tracking in-situ operation, administration, and maintenance capability, an end-to-end in-situ operation, administration, and maintenance capability, a data direct exporting in-situ operation, administration, and maintenance capability, or an enhanced alternate marking in-situ operation, administration, and maintenance capability.

Optionally, in a possible implementation, the first packet includes a border gateway protocol (BGP) packet, the BGP packet includes a first attribute, and the first indication information is carried in the first attribute. An attribute in an existing BGP packet is extended to carry indication information used to notify an iFIT capability, so that modifications to a conventional technology can be reduced as much as possible, and implementability of the solution can be improved.

Optionally, in a possible implementation, the first attribute includes a next-hop capability attribute, an extended community attribute, or a next-hop path attribute.

Optionally, in a possible implementation, the first attribute further carries next-hop information, and the next-hop information includes an address of the first network device. The next-hop information is carried in the first attribute, so that the second network device can determine, based on the next-hop information in the first attribute, a network device corresponding to the iFIT capability carried in the first attribute, to improve implementability of the solution.

Optionally, in a possible implementation, the first attribute includes the next-hop path attribute, and before that a first network device sends a first packet to a second network device, the method further includes: The first network device receives a second packet sent by a third network device, where the second packet includes second indication information, and the second indication information indicates a support status of an iFIT capability corresponding to the third network device; and that a first network device sends a first packet to a second network device includes: the first network device sends the first packet to the second network device based on the second packet, where the first packet further includes the second indication information. The packet carries support statuses of iFIT capabilities corresponding to a plurality of network devices, so that the second network device that receives the packet can learn of, based on a same packet, the iFIT capabilities corresponding to the plurality of network devices, to reduce packet overheads, ensure that the second network device can flexibly select, based on the iFIT capabilities of the plurality of network devices, a tail node for performing iFIT measurement, and improve solution flexibility.

Optionally, in a possible implementation, the first attribute further includes an address of the third network device. The first attribute further includes the address of the third network device, so that the second network can specify each network device corresponding to the iFIT capability carried in the packet, to improve implementability of the solution.

Optionally, in a possible implementation, the first attribute further carries an originating internet protocol (IP) address, and the originating IP address includes the address of the first network device. The originating IP address may be used to enhance validity check, and the address of the first network device is indicated to check whether a next hop carried in the first packet is the first network device that actually sends the first packet. This avoids information tampering, and reliability of the technical solution is further increased.

Optionally, in a possible implementation, the first packet includes a BGP packet or an interior gateway protocol (IGP) packet.

Optionally, in a possible implementation, before that a first network device sends a first packet to a second network device, the method further includes: The first network device generates the first packet based on a change of the iFIT capability of the first network device. When the iFIT capability of the network device is changed, the network device is triggered to generate a packet for notifying the changed iFIT capability of the network device, so that another network device can learn of the iFIT capability corresponding to the network device in a timely manner, to ensure that the another network device can correctly determine whether to encapsulate a measurement header, and ensure normal packet forwarding.

Optionally, in a possible implementation, the first indication information includes a first type length value (TLV), and the first TLV includes a first field. The first field includes one or more bits, and each bit in the first field indicates that the first network device is capable of or not capable of one of path tracking in-situ operation, administration, and maintenance capability, end-to-end in-situ operation, administration, and maintenance capability, data direct exporting in-situ operation, administration, and maintenance capability, or enhanced alternate marking in-situ operation, administration, and maintenance capability. Alternatively, the first field includes a plurality of values, and each value in the first field indicates that the first network device is capable of or not capable of one or more of path tracking in-situ operation, administration, and maintenance capability, end-to-end in-situ operation, administration, and maintenance capability, data direct exporting in-situ operation, administration, and maintenance capability, or enhanced alternate marking in-situ operation, administration, and maintenance capability. The field of the packet includes a plurality of bits or a plurality of values to indicate the support status of the iFIT capability. This can improve flexibility of solution implementation.

Optionally, in a possible implementation, after that the first network device sends the first packet, the method further includes: In response to the sending the first packet, the first network device receives a data packet sent by the second network device, where the data packet includes an iFIT measurement header; the first network device performs iFIT measurement based on the iFIT measurement header; and the first network device strips the iFIT measurement header from the data packet.

A second aspect of this application provides a capability notification method. The method includes: A second network device receives a first packet sent by a first network device, where the first packet includes first indication information, and the first indication information indicates a support status of an iFIT capability corresponding to the first network device or a first service module included in the first network device; and the second network device determines, based on the first packet, the support status of the iFIT capability corresponding to the first network device or the first service module.

Optionally, in a possible implementation, the support status of the iFIT capability includes a status that the first network device or the first service module is capable of iFIT processing or not capable of iFIT processing.

Optionally, in a possible implementation, the iFIT capability includes one or more of a path tracking in-situ operation, administration, and maintenance capability, an end-to-end in-situ operation, administration, and maintenance capability, a data direct exporting in-situ operation, administration, and maintenance capability, or an enhanced alternate marking in-situ operation, administration, and maintenance capability.

Optionally, in a possible implementation, after that the second network device determines, based on the first packet, the support status of the iFIT capability corresponding to the first network device or the first service module, the method further includes: The second network device receives a data packet; the second network device encapsulates an iFIT measurement header into the data packet based on the support status of the iFIT capability corresponding to the first network device or the first service module; and the second network device sends, to the first network device, a data packet into which the iFIT measurement header is encapsulated.

A third aspect of this application provides a first network device. The first network device includes: a sending unit, configured to send a first packet, where the first packet includes first indication information, and the first indication information indicates a support status of an in-situ flow information telemetry iFIT capability corresponding to the first network device or a first service module included in the first network device.

Optionally, in a possible implementation, the support status of the iFIT capability includes a status that the first network device or the first service module is capable of iFIT processing or not capable of iFIT processing.

Optionally, in a possible implementation, the iFIT capability includes one or more of a path tracking in-situ operation, administration, and maintenance capability, an end-to-end in-situ operation, administration, and maintenance capability, a data direct exporting in-situ operation, administration, and maintenance capability, or an enhanced alternate marking in-situ operation, administration, and maintenance capability.

Optionally, in a possible implementation, the first packet includes a border gateway protocol BGP packet, the BGP packet includes a first attribute, and the first indication information is carried in the first attribute.

Optionally, in a possible implementation, the first attribute includes a next-hop capability attribute, an extended community attribute, or a next-hop path attribute.

Optionally, in a possible implementation, the first attribute further carries an originating internet protocol IP address, the originating IP address includes an address of the first network device, and the originating IP address indicates that a device sending the first packet is the first network device.

Optionally, in a possible implementation, the first network device further includes a receiving unit, where the first attribute includes the next-hop path attribute, and the receiving unit is configured to receive a second packet sent by a third network device, where the second packet includes second indication information, and the second indication information indicates a support status of an iFIT capability corresponding to the third network device; and the sending unit is further configured to send the first packet to the second network device based on the second packet, where the first packet further includes the second indication information.

Optionally, in a possible implementation, the second indication information further includes an address of the third network device.

Optionally, in a possible implementation, the first packet includes a BGP packet or an interior gateway protocol IGP packet.

Optionally, in a possible implementation, the first network device further includes:

a processing unit, configured to generate the first packet based on a change of the iFIT capability of the first network device.

Optionally, in a possible implementation, the first indication information includes a first type length value TLV, and the first TLV includes a first field; and the first field includes one or more bits, and each bit in the first field indicates that the first network device is capable of or not capable of one of path tracking in-situ operation, administration, and maintenance capability, end-to-end in-situ operation, administration, and maintenance capability, data direct exporting in-situ operation, administration, and maintenance capability, or enhanced alternate marking in-situ operation, administration, and maintenance capability; or the first field includes a plurality of values, and each value in the first field indicate s that the first network device is capable of or not capable of one or more of path tracking in-situ operation, administration, and maintenance capability, end-to-end in-situ operation, administration, and maintenance capability, data direct exporting in-situ operation, administration, and maintenance capability, or enhanced alternate marking in-situ operation, administration, and maintenance capability.

Optionally, in a possible implementation, the receiving unit is further configured to: in response to the sending the first packet, receive a data packet sent by the second network device, where the data packet includes an iFIT measurement header; and the processing unit is further configured to: perform iFIT measurement based on the iFIT measurement header; and strip the iFIT measurement header from the data packet.

A fourth aspect of this application provides a second network device. The second network device includes:

a receiving unit, configured to receive a first packet sent by a first network device, where the first packet includes first indication information, and the first indication information indicates a support status of an iFIT capability corresponding to the first network device or a first service module included in the first network device; and a processing unit, configured to determine, based on the first packet, the support status of the iFIT capability corresponding to the first network device or the first service module.

Optionally, in a possible implementation, the support status of the iFIT capability includes a status that the first network device or the first service module is capable of iFIT processing or not capable of iFIT processing.

Optionally, in a possible implementation, the iFIT capability includes one or more of a path tracking in-situ operation, administration, and maintenance capability, an end-to-end in-situ operation, administration, and maintenance capability, a data direct exporting in-situ operation, administration, and maintenance capability, or an enhanced alternate marking in-situ operation, administration, and maintenance capability.

Optionally, in a possible implementation, the second network device further includes a sending unit, where the receiving unit is further configured to obtain a data packet;

the processing unit is further configured to encapsulate an iFIT measurement header into the data packet based on the support status of the iFIT capability corresponding to the first network device or the first service module; and the sending unit is further configured to send, to the first network device, a data packet into which the iFIT measurement header is encapsulated.

A fifth aspect of this application provides a network device. The network device includes a processor and a communication interface. The processor is configured to execute instructions, so that the network device is enabled to perform the method according to any one of the first aspect or the second aspect and the implementations of the first aspect or the second aspect.

A sixth aspect of this application provides a network system. The network system includes the first network device according to any one of the third aspect and the implementations of the third aspect and the second network device according to any one of the fourth aspect and the implementations of the fourth aspect.

A seventh aspect of this application provides a computer storage medium. The computer storage medium may be nonvolatile. The computer storage medium stores computer readable-instructions. When the computer-readable instructions are executed by a processor, the method according to any one of the first aspect or the second aspect and the implementations of the first aspect or the second aspect is implemented.

An eighth aspect of this application provides a computer program product including instructions. When the computer program product runs on a computer, the computer is enabled to perform the method according to any one of the first aspect or the second aspect and the implementations of the first aspect or the second aspect.

A ninth aspect of this application provides a chip system. The chip system includes a processor, configured to support a network device in implementing functions in the foregoing aspects, for example, sending or processing data and/or information in the foregoing methods. In a possible design, the chip system further includes a memory. The memory is configured to store program instructions and data that are necessary for the network device. The chip system may include a chip, or may include a chip and another discrete device.

It can be learned from the foregoing technical solutions that embodiments of this application have the following advantages:

Embodiments of this application provide the capability notification method and the related device. The first network device sends the packet to the second network device, to notify the support status of the IFIT capability of the first network device. In this way, the second network device can determine, based on the IFIT capability of the first network device, whether to encapsulate the measurement header, to avoid discarding the service packet because the first network device cannot strip the measurement header from the service packet. This ensures normal service packet forwarding.

DETAILED DESCRIPTION OF ILLUSTRATIVE EMBODIMENTS

Figure 1:
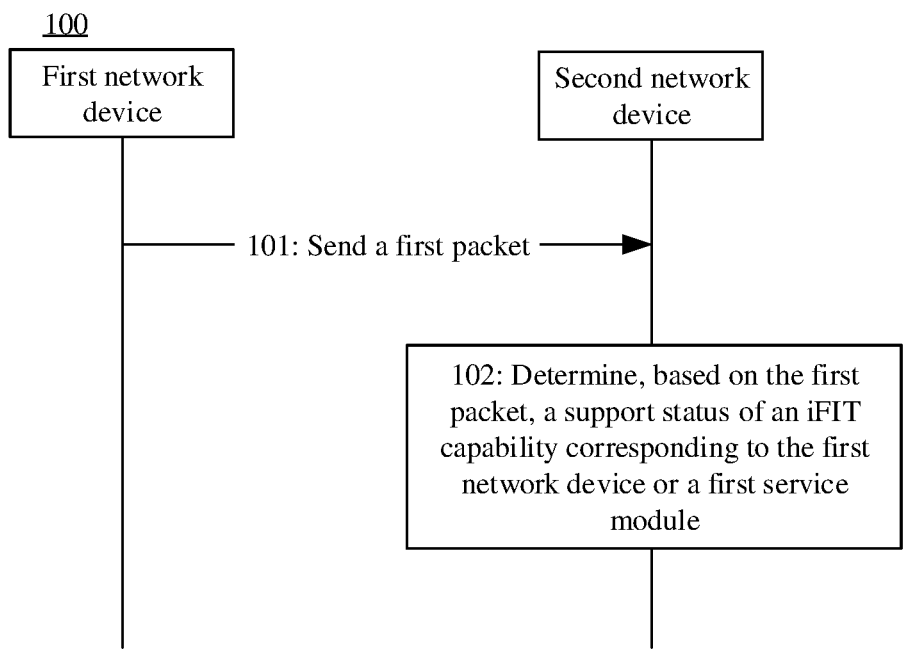
FIG. 1 is a schematic flowchart of a capability notification method wo according to an embodiment of this application.

In this specification, the claims, and the accompanying drawings of this application, terms "first", "second", "third", "fourth", and the like (if existent) are intended to distinguish between similar objects but do not necessarily indicate a specific order or sequence. It should be understood that data termed in such a way is interchangeable in appropriate circumstances, so that embodiments of this application described herein can be implemented in other orders than the order illustrated or described herein. In addition, terms such as "include", "correspond", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

In embodiments of this application, terms "example", "for example", and the like are used to represent giving an example, an illustration, or a description. Any embodiment or design scheme described as an "example" or "for example" in embodiments of this application should not be explained as being more preferred or having more advantages than another embodiment or design scheme. Exactly, use of the terms "example", "for example", and the like is intended to present a related concept in a specific manner.

In a related technology, when a head node encapsulates an iFIT measurement header in a packet, if a tail node does not have an iFIT capability, the tail node cannot strip the iFIT measurement header from the packet. As a result, the packet is discarded because the packet cannot be identified, which affects normal packet forwarding.

Therefore, before encapsulating the measurement header, the head node needs to confirm that the tail node has the iFIT capability. This usually requires operation and maintenance personnel to manually configure iFIT-related information on the head node, to ensure that the head node can determine, based on an iFIT capability of a related device, whether to encapsulate the measurement header before encapsulating the measurement header. However, manual configuration is inefficient and complex.

For example, in a network, a network device 1 and a network device 2 that are connected to each other are included, and the network device 2 is connected to an external network.

The network device 1 and the network device 2 may be respectively a head node and a tail node of an iFIT measurement domain. After the network device 1 obtains a to-be-sent packet, the network device 1 encapsulates an iFIT measurement header into the packet, and sends, to the network device 2, a packet into which the iFIT measurement header is encapsulated. The network device 2 performs data measurement and reporting based on the iFIT measurement header in the received packet, strips the iFIT measurement header from the packet, and forwards a data packet from which the iFIT measurement header is stripped to the external network.

Before the network device 1 needs to encapsulate the measurement header, whether the network device 2 supports iFIT and a specific capability of supporting iFIT needs to be determined. Otherwise, if the network device 2 does not support iFIT or the corresponding capability, after the network device 1 encapsulates the measurement header and sends the measurement header to the network device 2, an error may occur in packet processing or sending because the network device 2 does not support processing of the measurement header. In this case, the iFIT capability supported by the network device 2 is usually manually configured on the network device 1 by operation and maintenance personnel. This results in problems such as complex configuration and low configuration efficiency.

Further, after the network is changed, the network device 2 is changed from a device capable of iFIT processing to a device not capable of iFIT processing. Because the related configuration of the network device 2 on the network device 1 is manually configured by the operation and maintenance personnel, the network device 1 cannot perceive a change on the network device 2. In this way, after the network device 1 receives the packet, the network device 1 continues to encapsulate the iFIT measurement header into the packet, and forwards, to the network device 2, the packet into which the iFIT measurement header is encapsulated. However, because the network device 2 does not have the iFIT capability, the network device 2 cannot identify the iFIT measurement header in the packet, and consequently directly forwards the packet to the external network. The external network cannot identify the iFIT measurement header in the packet, and consequently discards the packet, which affects normal packet forwarding. In view of the foregoing problem, embodiments of this application provide a capability notification method and a related device. A first network device sends a packet to a second network device, to notify a support status of an IFIT capability of the first network device. In this way, the second network device can determine, based on the IFIT capability of the first network device, whether to encapsulate a measurement header, to avoid affecting normal packet forwarding because the first network device cannot correctly process the measurement header in the packet.

FIG. 1 is a schematic flowchart of a capability notification method wo according to an embodiment of this application. As shown in FIG. 1, the capability notification method 100 provided in this embodiment of this application includes the following steps.

Step 101: A first network device sends a first packet to a second network device, where the first packet includes first indication information, and the first indication information indicates a support status of an in-situ flow information telemetry iFIT capability corresponding to the first network device or a first service module included in the first network device.

In this embodiment, the first network device and the second network device may be, for example, physical devices such as routers, switches, or gateways, or may be virtual devices that support packet forwarding. Specific types of the first network device and the second network device are not limited in this embodiment. The first network device may include a plurality of service modules. The first service module may be a service module that is in the first network device and that may be configured to perform packet forwarding or packet processing, for example, a VPN processing module. The first packet may be, for example, a packet such as a border gateway protocol (BGP) packet or an interior gateway protocol (IGP) packet. In an example, the first packet is a BGP update packet, and is used for a notification route. For example, the first network device advertises, to the second network device, the notification route for the BGP update packet that carries the support status of the iFIT capability, where the route may be a service route, a tunnel route, an SRv6 route such as an SRv6 locator, or another route; and the second network device may normally receive and identify the iFIT capability carried in the packet. For an address range indicated by the BGP packet, the second network device may serve as an Encap node, and the first network device may serve as a Decap node.

In a possible implementation, the support status of the iFIT capability may be whether the first network device or the first service module is capable of iFIT processing.

For example, the first indication information may include a bit, and a value of the bit may be "0" or "1". When the value of the bit is "0", it indicates that the first network device or the first service module is not capable of iFIT processing. When the value of the bit is "1", it indicates that the first network device or the first service module is capable of iFIT processing.

In an example, before the first network device sends the first packet to the second network device, the first network device may further indicate, by sending another packet to the second network device, or negotiating with the second network device in advance, a specific iFIT capability or specific iFIT capabilities that is or are supported.

In another possible implementation, the support status of the iFIT capability may alternatively be a status that the first network device or the first service module is capable of iFIT processing or not capable of iFIT processing.

For example, the iFIT capability may include one or more of a path tracking in-situ operation, administration, and maintenance capability, an end-to-end in-situ operation, administration, and maintenance capability, a data direct exporting in-situ operation, administration, and maintenance capability, or an enhanced alternate marking in-situ operation, administration, and maintenance capability. That is, the first indication information may indicate that the first network device or the first service module is capable of and/or not capable of one or more of the four types of iFIT processing.

Optionally, in a possible example, the path tracking in-situ operation, administration, and maintenance capability may further include a pre-allocated path tracking in-situ operation, administration, and maintenance capability and an incremental path tracking in-situ operation, administration, and maintenance capability. To be specific, the iFIT capability may include one or more of the four capabilities: the path tracking in-situ operation, administration, and maintenance capability, the end-to-end in-situ operation, administration, and maintenance capability, the data direct exporting in-situ operation, administration, and maintenance capability, or the enhanced alternate marking in-situ operation, administration, and maintenance capability. Alternatively, the iFIT capability may include one or more of the five capabilities: the pre-allocated path tracking in-situ operation, administration, and maintenance capability, the incremental path tracking in-situ operation, administration, and maintenance capability, the end-to-end in-situ operation, administration, and maintenance capability, the data direct exporting in-situ operation, administration, and maintenance capability, or the enhanced alternate marking in-situ operation, administration, and maintenance capability. For ease of description, the following uses an example in which the iFIT capability includes the four iFIT capabilities.

In a possible example, the first indication information may include a first TLV, the first TLV includes a first field, and the first field indicates an iFIT capability supported and/or not supported. In other words, the first network device may add a TLV to the first packet, and carry, by using a field in the TLV, an iFIT capability supported and/or not supported by the first network device.

In a possible example, the first field includes one or more bits, and each bit in the first field indicates that the first network device is capable of or not capable of one of the foregoing four types of iFIT processing.

For example, when the iFIT capability includes the foregoing four iFIT capabilities, the first field includes four bits. The four bits may be, for example, a bit "T", a bit "E", a bit "D", and a bit "A", and respectively indicate support statuses corresponding to the path tracking in-situ operation, administration, and maintenance capability, the end-to-end in-situ operation, administration, and maintenance capability, the data direct exporting in-situ operation, administration, and maintenance capability, and the enhanced alternate marking in-situ operation, administration, and maintenance capability. For details, refer to Table 1. Table 1 is an example in which the iFIT capability is indicated by using four bits.

TABLE 1

Bit Definition of the iFIT capability

T   Indicates the support status of the "path tracking in-situ operation,
    administration, and maintenance capability":
    T = 0, indicating that the path tracking in-situ operation,
    administration, and maintenance capability is not supported
    T = 1, indicating that the path tracking in-situ operation,
    administration, and maintenance capability is supported
E   Indicates the support status of the "end-to-end in-situ operation,
    administration, and maintenance capability":
    E = 0, indicating that the end-to-end in-situ operation, administration,
    and maintenance capability is not supported
    E = 1, indicating that the end-to-end in-situ operation, administration,
    and maintenance capability is supported
D   Indicates the support status of the "data direct exporting in-situ
    operation, administration, and maintenance capability":
    D = 0, indicating that the data direct exporting in-situ operation,
    administration, and maintenance capability is not supported
    D = 1, indicating that the data direct exporting in-situ operation,
    administration, and maintenance capability is supported
A   Indicates the support status of the "enhanced alternate marking in-situ
    operation, administration, and maintenance telemetry capability":
    A = 0, indicating that the enhanced alternate marking in-situ
    operation, administration, and maintenance capability is not supported
    A = 1, indicating that the enhanced alternate marking in-situ
    operation, administration, and maintenance capability is supported It may be learned from Table 1 that the support statuses of the foregoing four iFIT capabilities may be effectively indicated by using different values of the four bits. It may be understood that, the foregoing descriptions are provided by using an example in which a quantity of bits included in the first field is four. In an actual case, there may alternatively be another quantity of bits included in the first field. For example, the first field may include one bit, two bits, five bits, and the like. When the quantity of bits in the first field is less than four, the quantity of bits in the first field corresponds to a quantity of iFIT capabilities that can be indicated by the first field. For example, the first field including only one bit may indicate only a support status of any one of the foregoing four iFIT capabilities. When the quantity of bits in the first field is greater than four, on the basis of indicating the foregoing four iFIT capabilities, a specific bit may be further reserved as a reserved bit, to facilitate subsequent extended use.

For another example, when the iFIT capability includes the foregoing five iFIT capabilities, the first field may include five bits. The five bits may be, for example, a bit "P", a bit "I", a bit "E", a bit "D", and a bit "A", and respectively indicate support statuses corresponding to the pre-allocated path tracking in-situ operation, administration, and maintenance capability, the incremental path tracking in-situ operation, administration, and maintenance capability, the end-to-end in-situ operation, administration, and maintenance capability, the data direct exporting in-situ operation, administration, and maintenance capability, and the enhanced alternate marking in-situ operation, administration, and maintenance capability.

In another possible example, the first field includes a plurality of values, and each value in the first field indicates that the first network device is capable of or not capable of one or more of the foregoing four types of iFIT processing.

For example, the first field includes four bits, and the four bits may indicate 16 different values such as "0000" to "1111", that is, the first field may include 15 values. In this way, different values of the four bits may indicate any one or any combination of the four iFIT capabilities. For example, "0000" indicates that the foregoing four iFIT capabilities are not supported. "0001" to "0000" may respectively indicate that any one of the foregoing four iFIT capabilities is supported and that the other three of the foregoing four iFIT capabilities are not supported. "0101" to "1010" respectively indicate that any two of the foregoing four iFIT capabilities are supported and that the other two of the foregoing four iFIT capabilities are not supported. "1011" to "1110" respectively indicate that any three of the foregoing four iFIT capabilities are supported and that the other one of the foregoing four iFIT capabilities is not supported. "1111" indicates that the foregoing four capabilities are supported.

It may be understood that, a quantity of values included in the first field may alternatively be determined based on an actual situation. For example, the first field may include four values, and each of the four values indicates that one of the foregoing four iFIT capabilities is supported. This embodiment is not limited to how the first field indicates the support status of the iFIT capability by using different values.

In this embodiment, there may be a plurality of cases in which the first network device is triggered to send the first packet to the second network device.

Case 1: The iFIT capability of the first network device is changed.

For example, when the first network device obtains instructions for changing the iFIT capability, the first network device may determine that the iFIT capability of the first network device is changed. The first network device may generate the first packet based on the changed iFIT capability, send the first packet to the second network device, and notify the second network device of a support status of the changed iFIT capability. For example, the instructions for changing the iFIT capability may be delivered by operation and maintenance personnel to the first network device by entering a command line.

Case 2: The first network device is a device newly deployed in the network.

For example, the first network device may be a device directly deployed in the network in a network deployment process (for example, in an early stage of network deployment). Alternatively, the first network device may be a device newly deployed in the network by replacing an original device in the network in a network maintenance process. In this way, after the newly deployed first network device is powered on and started, the first network device may automatically trigger to send the first packet to the second network device, to notify the second network device of the support status of the iFIT capability of the first network device.

It may be understood that, in addition to the foregoing cases, the first network device may alternatively be triggered to send the first packet to the second network device in another case. For example, a periodicity may be set to trigger the first network device to periodically send the first packet to the second network device. A case in which the first network device is triggered to send the first packet to the second network device is not specifically limited in this embodiment of this application.

Step 102: The second network device determines, based on the first packet, the support status of the iFIT capability corresponding to the first network device or the first service module.

In correspondence to the first indication information carried in the first packet sent by the first network device, the second network device determines, based on the first indication information, the support status of the iFIT capability corresponding to the first network device or the first service module.

In this embodiment, after determining the support status of the iFIT capability corresponding to the first network device or the first service module, the second network device may determine whether a measurement header can be encapsulated into a data packet. For example, after the second network device determines that the first network device is capable of path tracking in-situ operation, administration, and maintenance capability, the second network device may encapsulate the measurement header into the data packet, and send, to the first network device, a data packet into which the measurement header is encapsulated, where the measurement header in the data packet indicates the first network device to perform path tracking in-situ operation, administration, and maintenance. For another example, after the second network device determines that the first network device is not capable of path tracking in-situ operation, administration, and maintenance capability, the second network device directly forwards, to the first network device, the data packet into which the measurement header is not encapsulated.

In this embodiment, the first network device sends the packet to the second network device, to notify the support status of the IFIT capability of the first network device. In this way, the second network device can determine, based on the IFIT capability of the first network device, whether to encapsulate the measurement header, to avoid affecting normal packet forwarding because the first network device cannot correctly process the measurement header in the packet.

The foregoing describes a process in which the first network device notifies the second network device of the support status of the iFIT capability of the first network device. The following describes in detail how the first network device notifies the support status of the iFIT capability of the first network device by using the first packet.

In a possible embodiment, the first packet may include a BGP packet, and the BGP packet may be, for example, a BGP update packet. The BGP packet includes a first attribute, and the first indication information is carried in the first attribute. For example, the first attribute may include a next-hop capability attribute, an extended community attribute, or a next-hop path attribute. A TLV is newly added to the first attribute, so that the support status of the iFIT capability corresponding to the first network device or the first service module may be carried.

It may be understood that, in addition to the foregoing first attribute, the BGP packet sent by the first network device to the second network device further includes a next hop, and the next hop in the BGP packet is an address of the first network device. In this way, after the second network device receives the BGP packet sent by the first network device, the second network device may determine, based on that the next hop in the BGP packet is the first network device, that a device indicated by the first indication information in the first attribute is the first network device, that is, determine that the iFIT capability of the first network device is the iFIT capability carried in the first attribute.

In a possible example, the first attribute may further carry an originating IP address, and the originating IP address includes the address of the first network device. The originating IP address may be used for enhanced validity check, and the address of the first network device (namely, an address of an originating network device that sends the first packet) is indicated, to check whether the next hop carried in the first packet is the first network device that actually sends the first packet. Optionally, the originating IP address may also be referred to as next-hop information, that is, the first attribute may carry the next-hop information, and the next-hop information includes the address of the first network device.

It may be understood that, in some cases, the first network device and the second network device may not be directly connected, that is, another device may be further connected between the first network device and the second network device. For example, a route reflector is further connected between the first network device and the second network device. In this case, the first network device sends the first packet to the route reflector, and then the route reflector forwards the first packet to the second network device. In a process in which the route reflector forwards the first packet, the route reflector may modify the next hop in the first packet to an address of the route reflector (that is, modify the next hop from the first network device to the route reflector). As a result, the second network device cannot determine, based on the next hop in the first packet, a device corresponding to the iFIT capability carried in the first attribute.

Figure 2:
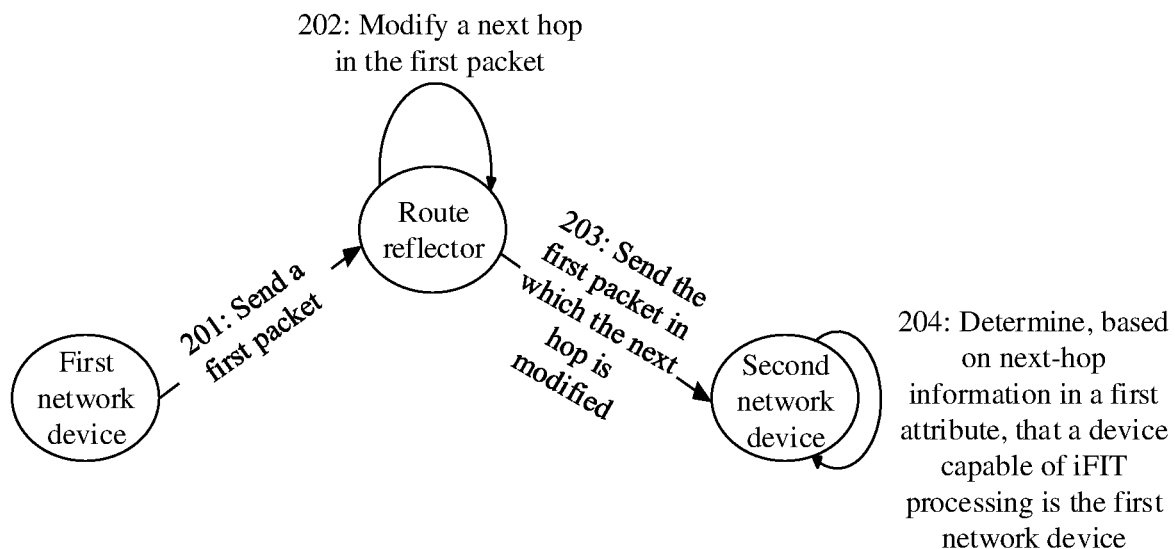
FIG. 2 is a schematic diagram of a packet sending procedure according to an embodiment of this application.

For example, FIG. 2 is a schematic diagram of a packet sending procedure according to an embodiment of this application. As shown in FIG. 2, in step 201, a first network device sends a first packet to a route reflector, where a next hop in the first packet is an address of the first network device. The first packet includes a first attribute used to carry an iFIT capability of the first network device, the first attribute includes next-hop information, and the next-hop information is also the address of the first network device. In step 202, the route reflector modifies the next hop in the first packet to an address of the route reflector, but does not modify the first attribute in the first packet. In step 203, the route reflector sends, to a second network device, the first packet to which the next hop is modified. In step 204, the second network device determines, based on the next-hop information in the first attribute, that a device capable of iFIT processing is the first network device instead of the route reflector indicated in the next hop in the first packet.

In other words, the next-hop information is carried in the first attribute in the first packet, so that when there is another network device between the first network device and the second network device, it can be ensured that the second network device can determine the network device corresponding to the iFIT capability carried in the first attribute.

In a possible example, the first attribute includes a next-hop path attribute, and the next-hop path attribute may carry support statuses of iFIT capabilities corresponding to a plurality of network devices.

For example, before that the first network device sends the first packet to the second network device, the method may further include: The first network device receives a second packet sent by a third network device, where the second packet includes second indication information, and the second indication information indicates a support status of an iFIT capability corresponding to the third network device. The first network device sends the first packet to the second network device based on the second indication information in the second packet, where the first packet further includes the second indication information.

In other words, the first packet sent by the first network device includes the first indication information and the second indication information, respectively indicating the support statuses of the iFIT capabilities corresponding to the first network device and the third network device. In this way, after the second network device receives the first packet, the second network device may learn of, based on the first packet, the support statuses of the iFIT capabilities corresponding to the first network device and the third network device, that is, the second network device may learn of, based on a same packet, support statuses of iFIT capabilities corresponding to a plurality of network devices.

The first indication information and the second indication information may be carried in the next-hop path attribute. For example, the next-hop path attribute may include a plurality of TLVs indicating iFIT capabilities, and the plurality of TLVs respectively carry iFIT capabilities corresponding to different network devices.

In a possible example, the next-hop path attribute may further include addresses of the first network device and the third network device, so that the second network device can determine a network device corresponding to the iFIT capability indicated in the next-hop path attribute. For example, the next-hop path attribute includes a TLV 1 and a TLV 2, the TLV 1 includes the address of the first network device and the support status of the corresponding iFIT capability, and the TLV 2 includes the address of the third network device and the support status of the corresponding iFIT capability. In this way, the second network device may determine, based on an address of a network device in a TLV, a support status of an iFIT capability corresponding to each network device.

For ease of understanding, the following describes, with reference to a specific example, a specific implementation in which the first network device notifies the support status of the iFIT capability of the first network device by using the attribute in the packet.

Figure 3A:
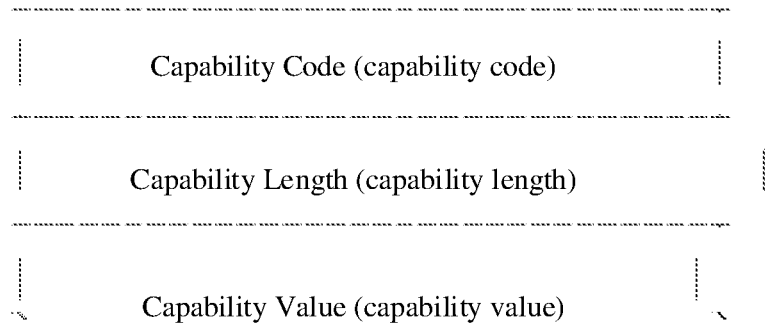
FIG. 3A is a schematic diagram of a packet format in which a next-hop capability attribute carries an iFIT capability according to an embodiment of this application.
Figure 3B:
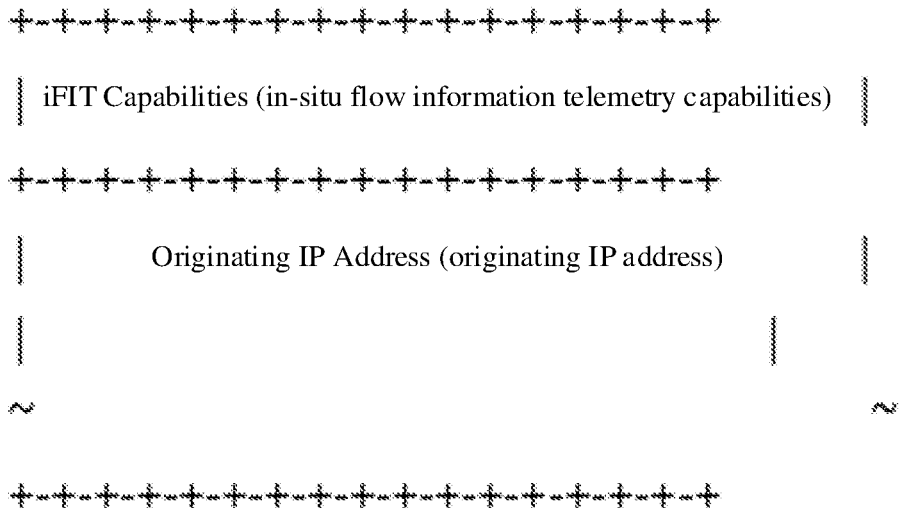
FIG. 3B is a schematic diagram of a packet format of a capability value field according to an embodiment of this application.

Example 1: A Next-Hop Capability Attribute in a BGP Packet Carries the Support Status of the iFIT Capability For example, FIG. 3A is a schematic diagram of a packet format in which a next-hop capability attribute carries an iFIT capability, namely, first indication information, according to an embodiment of this application. As shown in FIG. 3A, the next-hop capability attribute may include a capability code, a capability length, and a capability value. The capability code may indicate that the next-hop capability attribute carries the iFIT capability. The capability length may indicate a length of the capability value. The capability value may be used to carry the iFIT capability. For example, FIG. 3B is a schematic diagram of a packet format of a capability value field according to an embodiment of this application. As shown in FIG. 3B, the capability value may include the iFIT capability. Optionally, the capability value may further include an originating IP address. The iFIT capability may include a plurality of bits or a plurality of values, to indicate that the iFIT capability is supported and/or not supported. For details, refer to step 101. Details are not described herein again. The originating IP address may indicate an IPv4 address or an IPv6 address of the first network device, to enhance validity check.

Example 2: An Extended Community Attribute in a BGP Packet Carries the iFIT Capability For example, a possible format of an internet protocol version 4 (IPv4) extended community attribute in the BGP packet may be shown in Table 2.

TABLE 2

| Type 1 | Sub-Type 1 | iFIT Capability |
|---|---|---|
| Originating IPv4 Address | | |

The type 1 and the sub-type 1 may indicate that the IPv4 extended community attribute is used to carry the iFIT capability. The iFIT capability is used to carry a support status of the iFIT capability. The iFIT capability is similar to the foregoing capability value, and details are not described herein again. Optionally, the IPv4 extended community attribute may further include an originating IPv4 address, and the originating IPv4 address may be used to carry an originating IP address of a network device that sends a packet, namely, an IPv4 address of the first network device.

A possible format of an IPv6 extended community attribute in the BGP packet may be shown in Table 3.

TABLE 3

| Type 1 | Sub-Type 2 | iFIT Capability |
|---|---|---|
| Originating IPv6 Address | | |
| Originating IPv6 Address (continue) | | |
| Originating IPv6 Address (continue) | | |
| Originating IPv6 Address (continue) | | |

Similarly, the type 2 and the sub-type 2 may indicate that the IPv6 extended community attribute is used to carry the iFIT capability. Optionally, the IPv6 extended community attribute may further include a next-hop IPv6, and the next-hop IPv6 may be used to carry IPv6 next-hop information.

Figure 4:
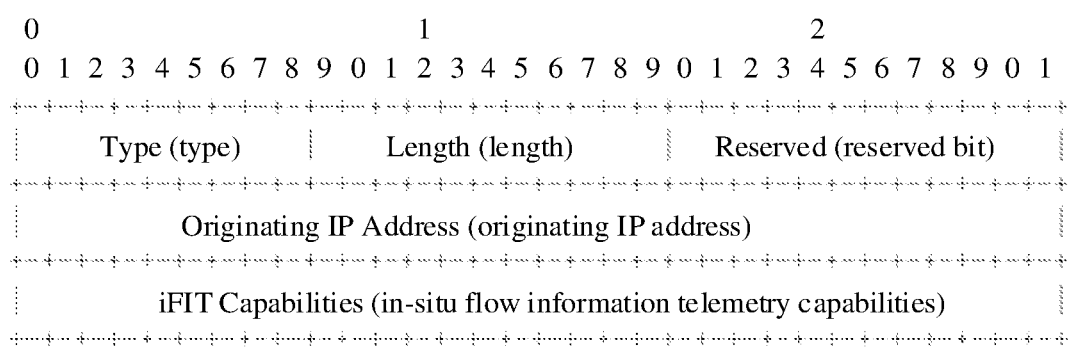
FIG. 4 is a schematic diagram of a format of a TLV in a next-hop path attribute according to an embodiment of this application.

Example 3: A Next-Hop Path Attribute in a BGP Packet Carries the iFIT Capability For example, FIG. 4 is a schematic diagram of a format of a TLV in a next-hop path attribute according to an embodiment of this application. As shown in FIG. 4, the TLV includes a type, a length, and a value. The value part in the TLV may include a reserved bit, an originating IP address, and iFIT capabilities. The TLV may indicate a support status of an iFIT capability corresponding to a network device. In the TLV, "Type" indicates a type of the TLV; "Length" indicates length information of the TLV; "Reserved" is used for extended use; "Originating IP Address" indicates an IP address of the network device that sends the TLV; and "iFIT Capability" is used to carry the iFIT capability.

In a possible example, in a process of advertising a route by using the BGP packet, the network device may include the foregoing TLV in the next-hop path attribute in the BGP packet, to indicate the support status of the corresponding iFIT capability. In a process of forwarding the BGP packet hop by hop, another network device responsible for forwarding the BGP packet may newly add the TLV to the next-hop path attribute in the BGP packet, to carry a support status of a corresponding iFIT capability. In other words, the next-hop path attribute in the BGP packet may carry a plurality of TLVs in a route advertisement sequence, to indicate support statuses of iFIT capabilities corresponding to different network devices.

Figure 5:
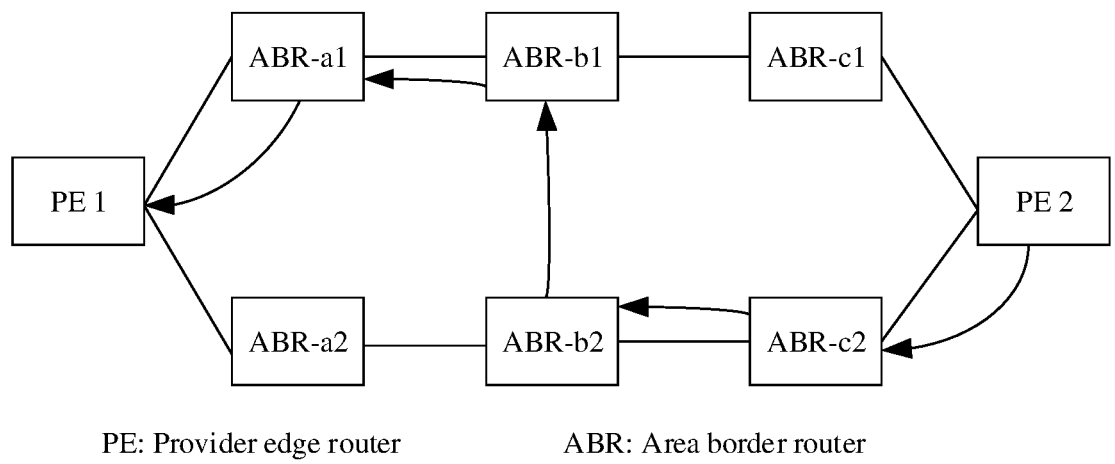
FIG. 5 is a schematic diagram of route advertisement according to an embodiment of this application.

For example, FIG. 5 is a schematic diagram of route advertisement according to an embodiment of this application. As shown in FIG. 5, a provider edge router (PE) 2 advertises a route by using a BGP packet, and the route sequentially passes through an area border router (ABR)-c2, an ABR-b2, an ABR-b1, an ABR-a1, and finally to a PE 1. In a process of forwarding the BGP packet hop by hop, each ABR along the path adds an iFIT capability corresponding to the ABR to a next-hop path attribute in the BGP packet by using the TLV shown in FIG. 4. Finally, the PE 1 may obtain iFIT capability information supported by each device in the BGP packet advertisement path. In a possible example, the iFIT capability information obtained by the PE 1 may be shown in Table 4.

TABLE 4

| Originating IP address | iFIT capabilities |
|---|---|
| 10.1.3.1 (ABR-a1) | T = 1, E = 0, D = 0, A = 0 |
| 10.1.4.1 (ABR-b1) | T = 1, E = 0, D = 0, A = 0 |
| 10.1.6.1 (ABR-b2) | T = 0, E = 1, D = 0, A = 0 |
| 10.1.8.1 (ABR-c2) | T = 0, E = 1, D = 0, A = 0 |
| 10.1.8.1 (PE 2) | T = 1, E = 1, D = 0, A = 0 |

It can be learned from Table 4 that each network device that sends the BGP packet along the path sequentially adds an IP address and an iFIT capability of the network device to the next-hop path attribute in the BGP packet. In this way, the PE 1 may determine, based on the obtained iFIT capability information, a specific network device that is used as a tail node to initiate iFIT measurement. In addition, the PE 1 may determine a sending sequence of the BGP packet based on an addition sequence of the iFIT capability in the BGP packet. For example, the PE 1 may determine, based on the addition sequence of the iFIT capability, that an IP address originally carried in the BGP packet is an originating IP address of the network device that originally advertises the BGP packet, that is, determine that 10.1.8.1 is the originating IP address of the network device that originally advertises the BGP packet.

For example, the PE 1 determines, based on the iFIT capability information shown in Table 4, that the iFIT capability of the ABR-a1 is: T=1, E=0, D=0, A=0, that is, the ABR-a1 is capable of only path tracking in-situ operation, administration, and maintenance capability. Therefore, the PE 1 may use the PE 1 as a head node and use the ABR-a1 as a tail node, to initiate path tracking in-situ operation, administration, and maintenance.

For another example, the PE 1 determines, based on the iFIT capability information shown in Table 4, that the iFIT capability of the PE 2 is: T=1, E=1, D=0, A=0, that is, the PE 2 is capable of both path tracking in-situ operation, administration, and maintenance capability and end-to-end in-situ operation, administration, and maintenance capability. Therefore, the PE 1 may use the PE 1 as a head node and use the PE 2 as a tail node, to initiate path tracking in-situ operation, administration, and maintenance or end-to-end in-situ operation, administration, and maintenance.

Example 4: This example describes an example of notifying a support status of an iFIT capability by a service module of the first network device. In an example, the service module may be an SR module, a tunnel module, or another service module that needs to notify an iFIT capability. This is not specifically limited in this application. This solution is applied to a network that supports segment routing (SR). The foregoing first packet is a BGP packet, and may carry segment routing internet protocol version 6 (SRv6) virtual private network (VPN) information, to notify the iFIT capability.

Figure 6:
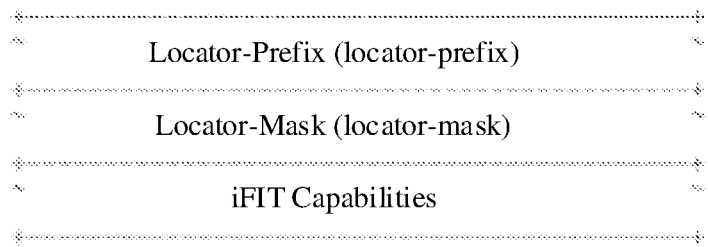
FIG. 6 is a schematic diagram of a format of a locator iFIT TLV according to an embodiment of this application.

For example, a TLV, for example, a locator iFIT TLV, is newly added to the BGP packet, so that the iFIT capability may be carried. FIG. 6 is a schematic diagram of a format of a locator iFIT TLV according to an embodiment of this application. As shown in FIG. 6, the locator iFIT TLV includes a plurality of fields, which are respectively a locator-prefix, a locator-mask, and iFIT capabilities. A length of the locator-prefix is 128 bits; and a value of the locator-mask ranges from 1 to 128. Based on the locator-prefix and the locator-mask, for example, after an "AND" operation is performed on the locator-prefix and the locator-mask, a value of a locator may be obtained, and the value is an IPv6 address network segment. In an SR network, in this form, a head node may monitor traffic by using an address network segment, to implement end-to-end overall traffic performance detection. In the foregoing descriptions, when the first network device notifies the support status of the iFIT capability by the service module of the first network device, a second network device may perform iFIT detection on only the corresponding service module. This avoids that a tail node receives excessive iFIT packets and is attacked.

The foregoing describes a process in which the first network device notifies, by using the attribute in the packet, the support status of the iFIT capability of the first network device. The following describes a process in which the second network device initiates iFIT measurement after the first network device notifies the second network device of the iFIT capability supported by the first network device.

Figure 7:
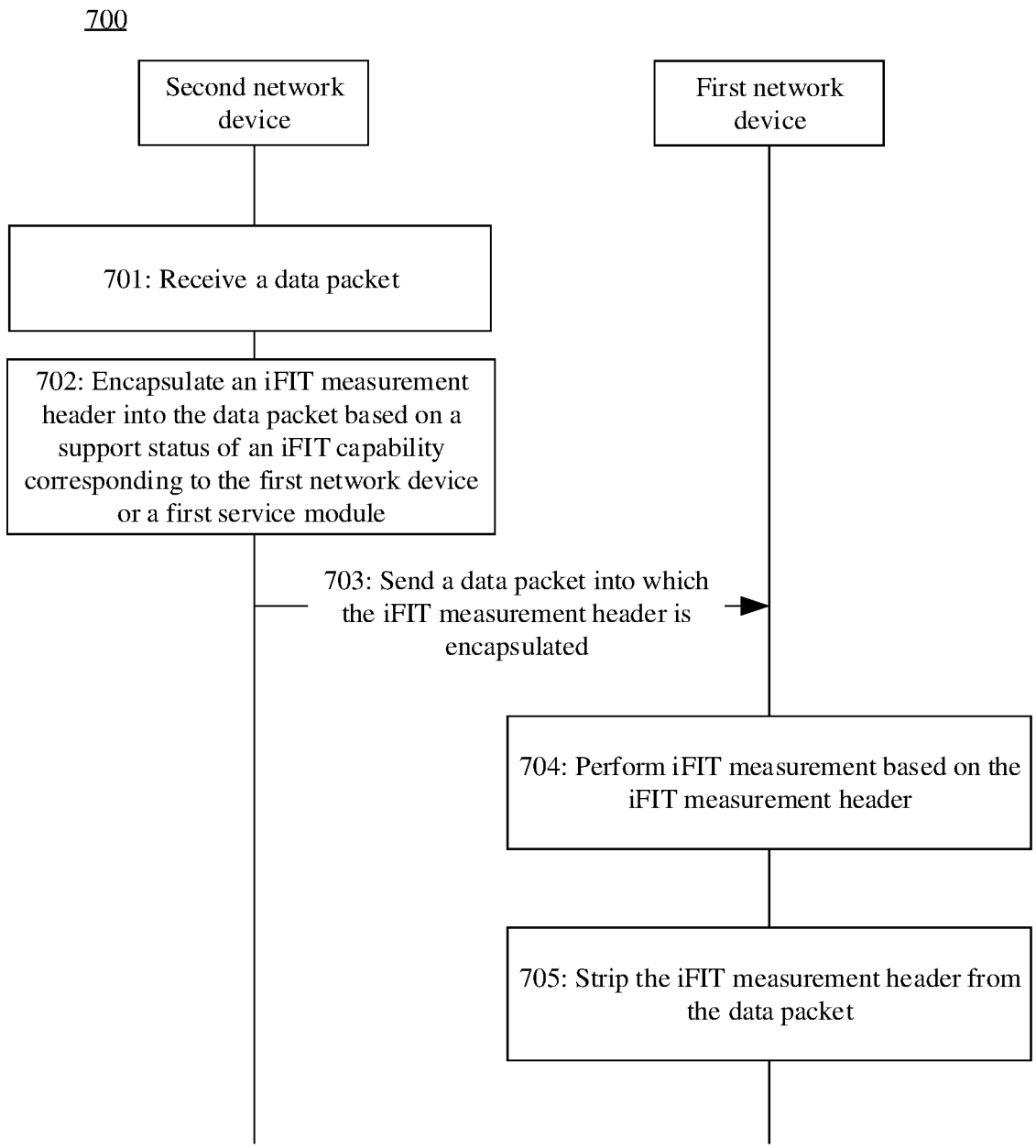
FIG. 7 is a schematic flowchart of an iFIT measurement method 700 according to an embodiment of this application.

FIG. 7 is a schematic flowchart of an iFIT measurement method 700 according to an embodiment of this application. As shown in FIG. 7, based on the capability notification method shown in FIG. 1, this embodiment of this application further provides the iFIT measurement method 700. The iFIT measurement method includes the following steps.

Step 701: A second network device obtains a data packet.

The data packet may be a packet to be forwarded after the second network device receives the data packet, and the second network device needs to forward the data packet to a first network device, to ensure that the data packet can be correctly forwarded to a destination.

Step 702: The second network device encapsulates an iFIT measurement header into the data packet based on a support status of an iFIT capability corresponding to the first network device or a first service module.

In this embodiment, the first network device or the first service module has a supported iFIT capability (for example, one or more of the foregoing four iFIT capabilities), and the second network device encapsulates the corresponding iFIT measurement header into the data packet based on the iFIT capability supported by the first network device or the first service module, to initiate corresponding iFIT measurement.

The second network device may use the second network device as a head node and the first network device as a tail node. For example, the second network device encapsulates an identifier of the first network device into the data packet, so that the first network device can determine that the first network device is the tail node.

Step 703: The second network device sends, to the first network device, a data packet into which the iFIT measurement header is encapsulated.

Step 704: The first network device performs iFIT measurement based on the iFIT measurement header.

Step 705: The first network device strips the iFIT measurement header from the data packet.

In this embodiment, after the first network device receives the data packet into which the iFIT measurement header is encapsulated, the first network device may identify the iFIT measurement header encapsulated into the data packet, to perform data measurement and reporting based on the iFIT measurement header. In addition, the first network device may identify that the first network device is the tail node for iFIT measurement. Therefore, after stripping the iFIT measurement header from the data packet, the first network device continues to forward the data packet from which the iFIT measurement header is stripped.

The method 100 and the method 703 in embodiments of this application are described above. Network devices in embodiments of this application are described below. The network devices described below have any function of the first network device or the second network device in the method 100 or the method 700.

Figure 8:
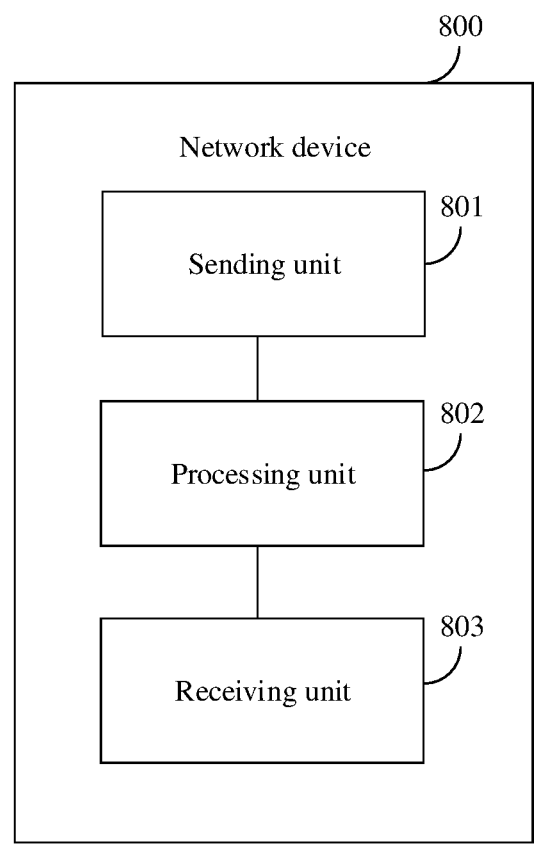
FIG. 8 is a schematic diagram of a structure of a network device 800 according to an embodiment of this application.

FIG. 8 is a schematic diagram of a structure of a network device 800 according to an embodiment of this application. As shown in FIG. 8, the network device 800 includes: a sending unit 801, configured to perform step 101 or 703; a processing unit 802, configured to perform step 102, 702, 704, or 705; and a receiving unit 803, configured to perform step 701.

The network device 800 corresponds to the first network device in the foregoing method embodiments. The units in the network device 800 and the foregoing other operations and/or functions are respectively used to implement various steps and methods that are performed by the first network device in the method embodiments. For specific details, refer to the method 100 or the method 700. For brevity, details are not described herein again.

When the network device 800 processes a packet, division into the foregoing functional modules is used as an example for description. During actual application, the foregoing functions may be allocated to different functional modules as required, that is, an internal structure of the network device 800 is divided into different functional modules, to implement all or a part of the functions described above. In addition, the network device 800 provided in the foregoing embodiment belongs to a same concept as the method in the embodiment corresponding to FIG. 1 or FIG. 7. For a specific implementation process of the network device 800, refer to the method 100 or the method 700. Details are not described herein again.

In correspondence to the method embodiments and the virtual apparatus embodiment provided in this application, an embodiment of this application further provides a network device. The following describes a hardware structure of the network device.

The network device 900 or the network device 1000 described below corresponds to the first network device or the second network device in the foregoing method embodiments, hardware and modules in the network device 900 or the network device 1000 and the foregoing other operations and/or functions are respectively used to implement various steps and methods that are performed by the first network device or the second network device in the method embodiments. For a detailed procedure of how the network device 900 or the network device 1000 performs capability notification, refer to the foregoing method embodiments for specific details. For brevity, details are not described herein again. The steps of the method 100 or the method 700 are completed by using an integrated logic circuit of hardware in a processor of the network device 900 or the network device 1000 or instructions in a form of software. The steps of the method disclosed with reference to embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

The network device 900 or the network device 1000 corresponds to the network device 800 in the foregoing virtual apparatus embodiment, and each functional module in the network device 800 is implemented by using software of the network device 900 or the network device 1000. In other words, the functional module included in the network device 800 is generated after the processor of the network device 900 or the network device 1000 reads program code stored in the memory.

Figure 9:
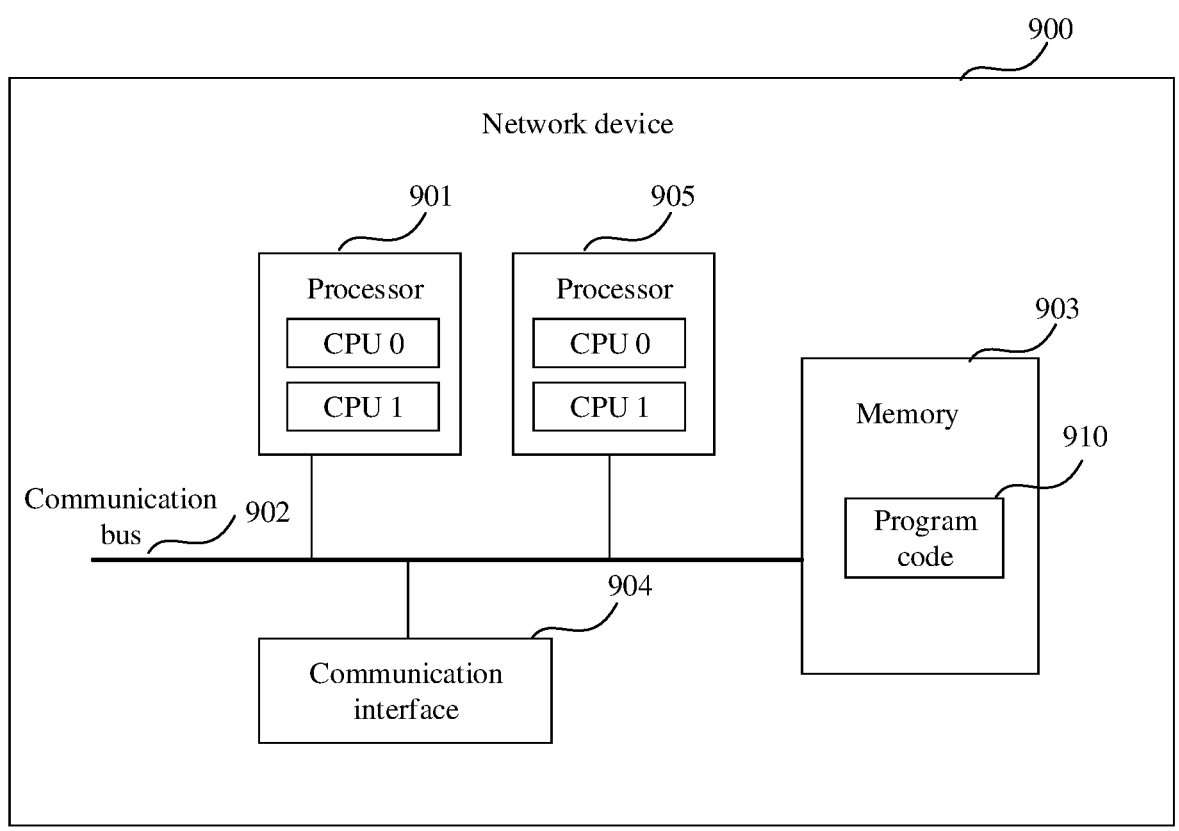
FIG. 9 is a schematic diagram of a structure of a network device 900 according to an example embodiment of this application.

FIG. 9 is a schematic diagram of a structure of a network device 900 according to an example embodiment of this application. The network device 900 may be configured as the first network device or the second network device. The network device 900 may be implemented by a general bus architecture.

The network device 900 includes at least one processor 901, a communication bus 902, a memory 903, and at least one communication interface 904.

The processor 901 may be a general-purpose CPU, an NP, or a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field programmable logic gate array (FPGA), a generic array logic (generic array logic, GAL), or any combination thereof.

The communication bus 902 is configured to transmit information between the foregoing components. The foregoing communication bus 902 may be classified into an address bus, a data bus, a control bus, and the like. For ease of indication, the bus is indicated by using only one bold line in the figure. However, it does not indicate that there is only one bus or only one type of bus.

The memory 903 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc (DVD), a Blu-ray disc, or the like), a disk storage medium or another magnetic storage device, or any other medium that can be used to carry or store expected program code in a form of instructions or a data structure and that can be accessed by a computer. However, the memory 903 is not limited thereto. The memory 903 may exist independently, and is connected to the processor 901 through the communication bus 902. Alternatively, the memory 903 may be integrated with the processor 901.

The communication interface 904 uses any apparatus such as a transceiver, and is configured to communicate with another device or a communication network. The communication interface 904 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, or a combination thereof.

During specific implementation, in an embodiment, the processor 901 may include one or more CPUs such as a CPU 0 and a CPU 1 in FIG. 9.

During specific implementation, in an embodiment, the network device 900 may include a plurality of processors, such as the processor 901 and a processor 905 shown in FIG. 9. Each of these processors may be a single-core processor (single-CPU) or a multi-core processor (multi-CPU). The processor herein may refer to one or more devices, circuits, and/or processing cores configured to process data (for example, computer program instructions).

During specific implementation, in an embodiment, the network device 900 may further include an output device 906 and an input device 907. The output device 906 communicates with the processor 901, and may display information in a plurality of manners. For example, the output device 906 may be a liquid crystal display (LCD), a light emitting diode (LED) display device, a cathode ray tube (CRT) display device, or a projector. The input device 907 communicates with the processor 901, and may receive a user input in a plurality of manners. For example, the input device 907 may be a mouse, a keyboard, a touchscreen device, or a sensor device.

In some embodiments, the memory 903 is configured to store program code 910 for executing the solutions of this application, and the processor 901 may execute the program code 910 stored in the memory 903. In other words, the network device 900 may implement the method 100 or the method 700 provided in the method embodiments through the processor 901 and the program code 910 in the memory 903.

The network device 900 in this embodiment of this application may correspond to the first network device or the second network device in the foregoing method embodiments. In addition, the processor 901, the communication interface 904, and the like in the network device 900 may implement functions of the first network device or the second network device and/or various steps and methods that are performed by the first network device or the second network device in the foregoing method embodiments. For brevity, details are not described herein again.

The sending unit 801 and the receiving unit 803 in the network device 800 are equivalent to the communication interface 904 in the network device 900. The processing unit 802 in the network device 800 may be equivalent to the processor 901 in the network device 900.

Figure 10:
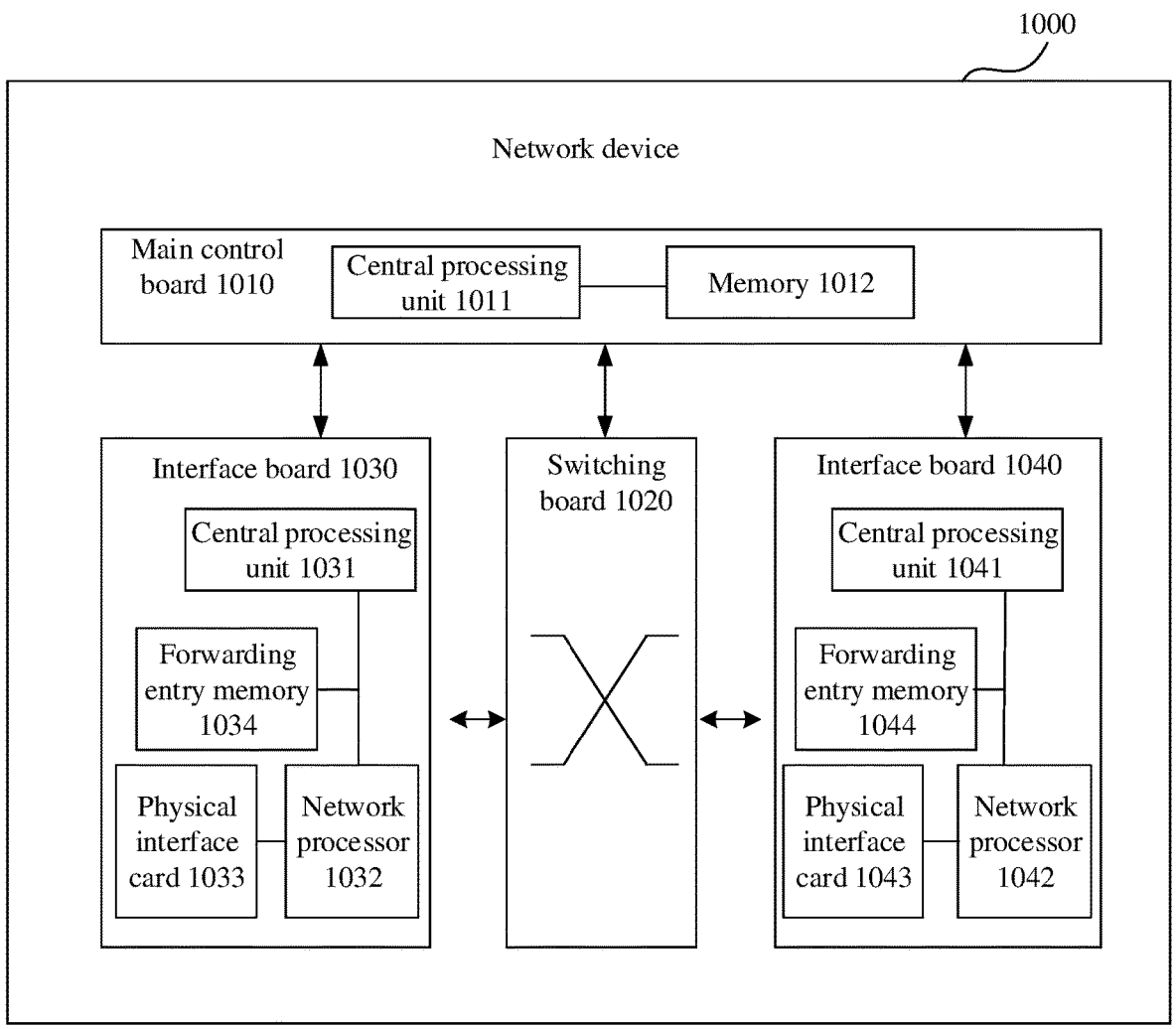
FIG. 10 is a schematic diagram of a structure of a network device 1000 according to an example embodiment of this application.

FIG. 10 is a schematic diagram of a structure of a network device 1000 according to an example embodiment of this application. The network device 1000 may be configured as the first network device or the second network device in the method 100 or the method 700 in the foregoing method embodiments. The network device 1000 includes a main control board 1010 and an interface board 1030.

The main control board 1010 is also referred to as a main processing unit (MPU) or a route processor card. The main control board 1010 is configured to control and manage components in the network device 1000, including functions of route calculation, device management, device maintenance, and protocol processing. The main control board 1010 includes a central processing unit 1011 and a memory 1012.

The interface board 1030 is also referred to as a line processing unit (LPU), a line card, or a service board. The interface board 1030 is configured to provide various service interfaces and implement data packet forwarding. The service interface includes but is not limited to an Ethernet interface, a POS (Packet over SONET/SDH) interface, and the like. The Ethernet interface is, for example, a flexible Ethernet client (FlexE Client). The interface board 1030 includes a central processing unit 1031, a network processor 1032, a forwarding entry memory 1034, and a physical interface card (PIC) 1033.

The central processing unit 1031 on the interface board 1030 is configured to control and manage the interface board 1030 and communicate with the central processing unit 1011 on the main control board 1010.

The network processor 1032 is configured to implement packet forwarding processing. A form of the network processor 1032 may be a forwarding chip. Specifically, the network processor 1032 is configured to: forward a received packet based on a forwarding table stored in the forwarding entry memory 1034; and if a destination address of the packet is an address of the network device 1000, upload the packet to a CPU (for example, the central processing unit 1011) for processing; or if a destination address of the packet is not an address of the network device 1000, search for a next hop and an outbound interface corresponding to the destination address from the forwarding table based on the destination address, and forward the packet to the outbound interface corresponding to the destination address. Uplink packet processing includes packet inbound interface processing and forwarding table searching; and downlink packet processing includes forwarding table searching, and the like.

The physical interface card 1033 is configured to implement a physical layer interconnection function. Original traffic enters the interface board 1030, and a packet obtained after processing is sent out from the physical interface card 1033. The physical interface card 1033 is also referred to as a subcard, may be installed on the interface board 1030, and is responsible for converting an optical/electrical signal into a packet, performing validity check on the packet, and then forwarding the packet to the network processor 1032 for processing. In some embodiments, the central processing unit may also perform a function of the network processor 1032, for example, implement software forwarding based on a general-purpose CPU, so that the network processor 1032 is not required in the physical interface card 1033.

Optionally, the network device 1000 includes a plurality of interface boards. For example, the network device 1000 further includes an interface board 1040. The interface board 1040 includes a central processing unit 1041, a network processor 1042, a forwarding entry memory 1044, and a physical interface card 1043.

Optionally, the network device 1000 further includes a switching board 1020. The switching board 1020 may also be referred to as a switch fabric unit (SFU). When the network device has a plurality of interface boards 1030, the switching board 1020 is configured to implement data exchange between the interface boards. For example, the interface board 1030 and the interface board 1040 may communicate with each other through the switching board 1020.

The main control board 1010 is coupled to the interface board 1030. For example, the main control board 1010, the interface board 1030, the interface board 1040, and the switching board 1020 are connected to a system backplane through a system bus for interconnection. In a possible implementation, an inter-process communication (IPC) channel is established between the main control board 1010 and the interface board 1030, and communication is performed between the main control board 1010 and the interface board 1030 through the IPC channel.

Logically, the network device 1000 includes a control plane and a forwarding plane. The control plane includes the main control board 1010 and the central processing unit 1031. The forwarding plane includes components that perform forwarding, such as the forwarding entry memory 1034, the physical interface card 1033, and the network processor 1032. The control plane performs functions such as a router, forwarding table generation, signaling and protocol packet processing, and device status configuration and maintenance. The control plane delivers a generated forwarding table to the forwarding plane. On the forwarding plane, the network processor 1032 searches for and forwards, based on the forwarding table delivered by the control plane, the packet received by the physical interface card 1033. The forwarding table delivered by the control plane may be stored in the forwarding entry memory 1034. In some embodiments, the control plane and the forwarding plane may be completely separate and not on a same device.

If the network device 1000 is configured as a first network device, the network processor 1032 may generate a first packet, and send the first packet out from the physical interface card 1033, so that the first packet is transmitted to a second network device.

If the network device 1000 is configured as a second network device, the physical interface card 1033 receives a first packet, and sends the first packet to the network processor 1032, so that the network processor 1032 obtains, from the first packet, a support status of an iFIT capability of a first network device.

The sending unit 801 and the receiving unit 803 in the network device 800 may be equivalent to the physical interface card 1033 in the network device 1000. The processing unit 802 in the network device 800 may be equivalent to the network processor 1032 or the central processing unit 1011.

In this embodiment of this application, an operation on the interface board 1040 is the same as an operation on the interface board 1030. For brevity, details are not described again. The network device 1000 in this embodiment may correspond to the first network device or the second network device in the foregoing method embodiments. The main control board low, the interface board 1030, and/or the interface board 1040 in the network device 1000 may implement functions of the first network device or the second network device and/or various steps that are performed by the first network device or the second network device in the foregoing method embodiments. For brevity, details are not described herein again.

It should be noted that there may be one or more main control boards. When there are a plurality of main control boards, an active main control board and a standby main control board may be included. There may be one or more interface boards. The stronger the data processing capability of the network device, the more interface boards are provided. There may also be one or more physical interface cards on the interface board. There may be no switching board or one or more switching boards. When there are a plurality of switching boards, load sharing and redundancy backup may be jointly implemented by the plurality of switching boards. In a centralized forwarding architecture, the network device may not require the switching board, and the interface board processes service data of the entire system. In a distributed forwarding architecture, the network device may have at least one switching board, and data exchange between a plurality of interface boards is implemented through the switching board, to provide a large-capacity data exchange and processing capability. Therefore, a data access and processing capability of the network device in the distributed architecture is greater than that of the device in the centralized architecture. Optionally, a form of the network device may also be that there is only one board, that is, there is no switching board, and functions of the interface board and the main control board are integrated into the board. In this case, a central processing unit on the interface board and a central processing unit on the main control board may be combined into one central processing unit on the board, and perform functions after the two are superposed. A data exchange and processing capability of the device in this form is low (for example, a network device such as a low-end switch or a router). A specific architecture that is to be used depends on a specific networking deployment scenario. This is not limited herein.

In some possible embodiments, the first network device or the second network device may be implemented as a virtualization device.

For example, the virtualization device may be a virtual machine (VM) running a program that has a function for sending a packet, and the virtual machine is deployed on a hardware device (for example, a physical server). The virtual machine is a complete software-simulated computer system that has complete hardware system functions and that runs in an entirely isolated environment. The virtual machine may be configured as the first network device or the second network device. For example, the first network device or the second network device may be implemented based on a general-purpose physical server in combination with a network function virtualization (NFV) technology. The first network device or the second network device is a virtual host, a virtual router, or a virtual switch. A person skilled in the art may, virtualize, on the general-purpose physical server, the first network device or the second network device having the foregoing functions, with reference to the NFV technology by reading this application. Details are not described herein.

For example, the virtualization device may be a container, and the container is an entity configured to provide an isolated virtualization environment. For example, the container may be a docker container. The container may be configured as the first network device or the second network device. For example, the first network device or the second network device may be created by using a corresponding image. For example, two container instances may be created for a proxy-container by using an image of the proxy-container (a container that provides a proxy service), and are respectively a container instance proxy-container 1 and a container instance proxy-container 2. The container instance proxy-container 1 is provided as the first network device or a first computing device, and the container instance proxy-container 2 is provided as the second network device or a second computing device. When a container technology is used for implementation, the first network device or the second network device may run by using a kernel of a physical machine, and a plurality of first network devices or second network devices may share an operating system of the physical machine. Different first network devices or second network devices may be isolated by using the container technology. The containerized first network device or second network device may run in the virtualization environment, for example, may run in the virtual machine, or the containerized first network device or second network device may directly run in the physical machine.

For example, the virtualization device may be a Pod, and the Pod is Kubernetes (where Kubernetes is an open source container orchestration engine of Google, which is K8s for short), and is a basic unit for deploying, managing, and orchestrating a containerized application. The Pod may include one or more containers. Each container in a same Pod is usually deployed on a same host. Therefore, each container in the same Pod may communicate through the host, and may share a storage resource and a network resource of the host. The Pod may be configured as the first network device or the second network device. For example, specifically, a container as a service (CaaS for short, and is a container-based PaaS service) may be instructed to create the Pod, and the Pod is provided as the first network device or the second network device.

Certainly, the first network device or the second network device may alternatively be another virtualization device. This is not enumerated herein one by one.

In some possible embodiments, the first network device or the second network device may alternatively be implemented by a general-purpose processor. For example, a form of the general-purpose processor may be a chip. Specifically, the general-purpose processor that implements the first network device or the second network device includes a processing circuit, and an input interface and an output interface that are internally connected to and communicated with the processing circuit. The processing circuit is configured to perform the packet generation step in the foregoing method embodiments through the input interface. The processing circuit is configured to perform the receiving step in the foregoing method embodiments through the input interface. The processing circuit is configured to perform the sending step in the foregoing method embodiments through the output interface. Optionally, the general-purpose processor may further include a storage medium, and the processing circuit is configured to perform the storage step in the foregoing method embodiments through the storage medium. The storage medium may store instructions executed by the processing circuit, and the processing circuit is configured to execute the instructions stored in the storage medium to perform the foregoing method embodiments.

Figure 11:
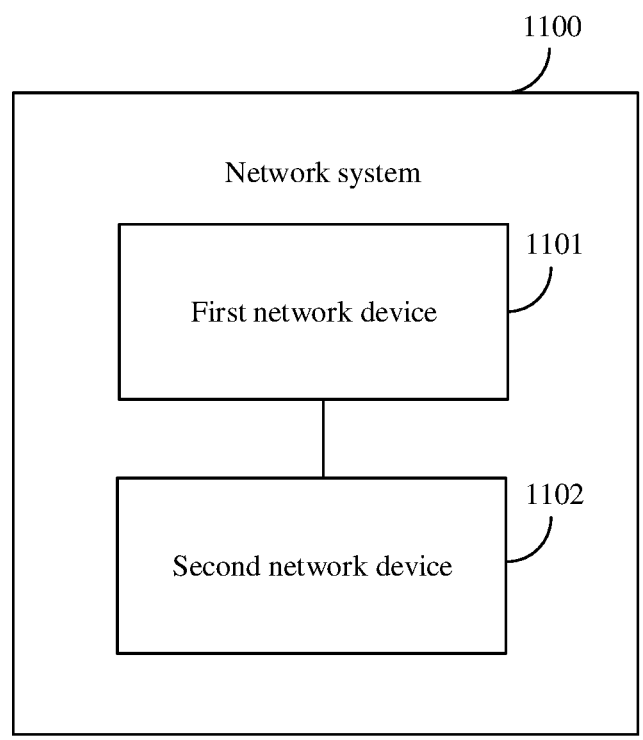
FIG. 11 is a schematic diagram of a structure of a network system 1100 according to an example embodiment of this application.

Refer to FIG. 11. An embodiment of this application provides a network system 1100. The system 1100 includes a first network device 1101 and a second network device 1102. Optionally, the first network device 1101 is, for example, the network device 800, the network device 900, or the network device 1000, and the second network device 1102 is the network device 800, the network device 900, or the network device 1000.

An embodiment of this application provides a computer program product. When the computer program product runs on a first network device or a second network device, the first network device or the second network device is enabled to perform the method 100 or the method 700 in the foregoing method embodiments.

The network devices in the foregoing product forms separately have any function of the first network device or the second network device in the foregoing method embodiments. Details are not described herein again.

A person of ordinary skill in the art may be aware that, the method steps and units described in embodiments disclosed in this specification may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, the disclosed system, apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement embodiments, all or some of embodiments may be implemented in a form of a computer program product. The computer program product includes one or more computer program instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but is not intended to limit this application. Any modification, equivalent replacement, or improvement made without departing from the spirit and principle of this application should fall within the protection scope of this application.

What is claimed is:

1. A method, comprising:
   sending, by a first network device, a first packet to a second network device, wherein the first packet comprises first indication information, and the first indication information indicates a support status of an in-situ flow information telemetry (iFIT) capability corresponding to the first network device or a first service module comprised in the first network device.

2. The method according to claim 1, wherein the support status of the iFIT capability comprises a status that the first network device or the first service module is capable of iFIT processing or not capable of iFIT processing.

3. The method according to claim 1, wherein the iFIT capability comprises one or more of a path tracking in-situ operation, administration, and maintenance capability, an end-to-end in-situ operation, administration, and maintenance capability, a data direct exporting in-situ operation, administration, and maintenance capability, or an enhanced alternate marking in-situ operation, administration, and maintenance capability.

4. The method according to claim 1, wherein the first packet comprises a border gateway protocol (BGP) packet, the BGP packet comprises a first attribute, and the first indication information is carried in the first attribute.

5. The method according to claim 4, wherein the first attribute further carries an originating internet protocol (IP) address, the originating IP address comprises an address of the first network device, and the originating IP address indicates that a device sending the first packet is the first network device.

6. The method according to claim 1, wherein the first packet comprises a BGP packet or an interior gateway protocol (IGP) packet.

7. The method according to claim 1, wherein before the sending, by a first network device, a first packet to a second network device, the method further comprises:
   generating, by the first network device, the first packet based on a change of the iFIT capability of the first network device.

8. The method according to claim 1, wherein the first indication information comprises a first type length value (TLV), and the first TLV comprises a first field; and
   the first field comprises one or more bits, and each bit in the first field indicates that the first network device is capable of or not capable of path tracking in-situ operation, administration, and maintenance capability, end-to-end in-situ operation, administration, and maintenance capability, data direct exporting in-situ operation, administration, and maintenance capability, or enhanced alternate marking in-situ operation, administration, and maintenance capability; or
   the first field comprises a plurality of values, and each value in the first field indicates that the first network device is capable of or not capable of one or more of path tracking in-situ operation, administration, and maintenance capability, end-to-end in-situ operation, administration, and maintenance capability, data direct exporting in-situ operation, administration, and maintenance capability, or enhanced alternate marking in-situ operation, administration, and maintenance capability.

9. The method according to claim 1, wherein after the sending, by the first network device, the first packet, the method further comprises:
   in response to the sending the first packet, receiving, by the first network device, a data packet sent by the second network device, wherein the data packet comprises an iFIT measurement header;
   performing, by the first network device, iFIT measurement based on the iFIT measurement header; and
   stripping, by the first network device, the iFIT measurement header from the data packet.

10. An apparatus, wherein the apparatus comprises:
    at least one processor; and
    at least one non-transitory computer-readable storage medium storing a program to be executed by the at least one processor, the program including instructions to:
    send a first packet, wherein the first packet comprises first indication information, and the first indication information indicates a support status of an in-situ flow information telemetry (iFIT) capability corresponding to the apparatus or a first service module comprised in the apparatus.

11. The apparatus according to claim 10, wherein the support status of the iFIT capability comprises a status that the apparatus or the first service module is capable of iFIT processing or not capable of iFIT processing.

12. The apparatus according to claim 10, wherein the iFIT capability comprises one or more of a path tracking in-situ operation, administration, and maintenance capability, an end-to-end in-situ operation, administration, and maintenance capability, a data direct exporting in-situ operation, administration, and maintenance capability, or an enhanced alternate marking in-situ operation, administration, and maintenance capability.

13. The apparatus according to claim 10, wherein the first packet comprises a border gateway protocol (BGP) packet, the BGP packet comprises a first attribute, and the first indication information is carried in the first attribute.

14. The apparatus according to claim 10, wherein the instructions further include instructions to:
   generate the first packet based on a change of the iFIT capability of the apparatus.

15. The apparatus according to claim 10, wherein the first packet comprises a BGP packet or an interior gateway protocol (IGP) packet.

16. A non-transitory storage medium storing a program, which when executed by one or more processors, cause the one or more processors to perform operations, the operations comprising:
   sending, a first packet to a second network device, wherein the first packet comprises first indication information, and the first indication information indicates a support status of an in-situ flow information telemetry (iFIT) capability corresponding to the one or more processors or a first service module comprised in the one or more processors.

17. The non-transitory storage medium according to claim 16, wherein the support status of the iFIT capability comprises a status that the one or more processors or the first service module is capable of iFIT processing or not capable of iFIT processing.

18. The non-transitory storage medium according to claim 16, wherein the iFIT capability comprises one or more of a path tracking in-situ operation, administration, and maintenance capability, an end-to-end in-situ operation, administration, and maintenance capability, a data direct exporting in-situ operation, administration, and maintenance capability, or an enhanced alternate marking in-situ operation, administration, and maintenance capability.

19. The non-transitory storage medium according to claim 16, wherein the first packet comprises a border gateway protocol (BGP) packet, the BGP packet comprises a first attribute, and the first indication information is carried in the first attribute.

20. The non-transitory storage medium according to claim 16, wherein the first packet comprises a BGP packet or an interior gateway protocol (IGP) packet.

* * * * *